United States Patent
Bian et al.

(10) Patent No.: US 11,081,982 B2
(45) Date of Patent: Aug. 3, 2021

(54) MOTOR ASSEMBLY AND ELECTRICAL DEVICE COMPRISING THE SAME

(71) Applicant: Zhongshan Broad-Ocean Motor Co., Ltd., Zhongshan (CN)

(72) Inventors: Wenqing Bian, Zhongshan (CN); Yuanyao Wu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 160 days.

(21) Appl. No.: 16/583,403

(22) Filed: Sep. 26, 2019

(65) Prior Publication Data

US 2020/0099283 A1 Mar. 26, 2020

(30) Foreign Application Priority Data

Sep. 26, 2018 (CN) .......................... 201821569959.7

(51) Int. Cl.
*H02P 6/08* (2016.01)
*H02K 27/20* (2006.01)
*H02K 7/14* (2006.01)
*H02K 9/06* (2006.01)
*H02K 11/35* (2016.01)

(52) U.S. Cl.
CPC .................. *H02P 6/08* (2013.01); *H02K 7/14* (2013.01); *H02K 9/06* (2013.01); *H02K 11/35* (2016.01); *H02K 27/20* (2013.01); *H02K 2203/03* (2013.01)

(58) Field of Classification Search
CPC .......... H02K 27/20; H02K 11/35; H02K 7/14; H02K 9/06; H02K 2203/03; H02P 6/08; H02P 23/0004; H02P 23/0027; H02N 6/085; F04D 27/004
See application file for complete search history.

(56) References Cited

U.S. PATENT DOCUMENTS

| | | | |
|---|---|---|---|
| 6,194,856 B1 * | 2/2001 | Kobayashi ............ | H02M 7/003 318/432 |
| 7,671,551 B2 * | 3/2010 | Bi .......................... | H02K 11/00 318/400.01 |
| 9,276,514 B2 * | 3/2016 | Zhao .................... | H02P 23/0004 |
| 9,306,479 B2 * | 4/2016 | Chen ....................... | H02P 21/22 |
| 9,571,015 B2 * | 2/2017 | Zhao ...................... | H02K 11/33 |
| 9,929,681 B2 * | 3/2018 | Yong ....................... | H02P 27/06 |

* cited by examiner

Primary Examiner — Burton S Mullins
(74) Attorney, Agent, or Firm — Matthias Scholl P.C.; Matthias Scholl

(57) ABSTRACT

A motor assembly including a motor and a control circuit board. The motor includes a housing, a stator assembly, a rotating shaft, and a rotor assembly. The control circuit board includes a first electric wire, a second electric wire, a detection wire, a ground wire, a power supply circuit, a control circuit, and a detection circuit. The first electric wire and the second electric wire are connected to the commercial AC electric supply, and the detection wire detects whether or not a load connected to the motor is electrified. The first electric wire and the second electric wire are connected to the input terminals of the power supply circuit. The detection circuit is disposed between the detection wire and the ground wire. The detection circuit transmits a detection signal to the control circuit, and the control circuit controls the motor to rotate at various rotation speeds.

20 Claims, 5 Drawing Sheets

MOTOR ASSEMBLY AND ELECTRICAL DEVICE COMPRISING THE SAME

CROSS-REFERENCE TO RELAYED APPLICATIONS

Pursuant to 35 U.S.C. § 119 and the Paris Convention Treaty, this application claims foreign priority to Chinese Patent Application No. 201821569959.7 filed Sep. 26, 2018, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

The disclosure relates to a motor assembly and to an electrical device comprising the same.

Conventionally, a motor assembly includes a motor and a control circuit board. The control circuit board includes a first electric wire, a second electric wire, a detection wire, a first detection circuit disposed between the first electric wire and the detection wire, and a second detection circuit disposed between the second electric wire and the detection wire. The first detection circuit and the second detection circuit transmit signals to the microprocessor of the control circuit board to control the operation of the motor at different speeds. The circuit configuration of the motor assembly is complex, and the possibility of miswiring exists.

SUMMARY

Provided is a motor assembly comprising a motor and a control circuit board. The motor comprises a housing, a stator assembly, a rotating shaft, and a rotor assembly; the control circuit board comprises a first electric wire, a second electric wire, a detection wire, a ground wire, a power supply circuit, a control circuit, and a detection circuit. The first electric wire and the second electric wire are connected to the commercial AC electric supply, and the detection wire detects whether or not a load connected to the motor is electrified. The first electric wire and the second electric wire are connected to the input terminals of the power supply circuit. The power supply circuit supplies a DC voltage to electrical parts of the control circuit board. The detection circuit is disposed between the detection wire and the ground wire. The detection circuit transmits a detection signal to the control circuit, and the control circuit controls the motor to rotate at various rotation speeds. When the load is not electrified, the detection circuit outputs a first level signal to the control circuit and the control circuit controls the motor to operate at a first speed. When the load is electrified, the detection circuit outputs a second level signal to the control circuit and the control circuit controls the motor to operate at a second speed.

The detection circuit can be an optocoupler detection circuit.

The optocoupler detection circuit comprises a first resistor, a second resistor and an optocoupler; the detection wire is connected to the first pin of the optocoupler via the first resistor; the second pin of the optocoupler is connected to the ground wire; the third pin of the optocoupler is connected to a DC power supply; the fourth pin of the optocoupler is connected to the second resistor and then to the ground wire, and the fourth pin of the optocoupler acts as a signal output pin.

The power supply circuit comprises an electromagnetic compatibility (EMC) circuit and a rectifier, and the commercial AC electric supply flows through the EMC circuit and the rectifier and outputs a bus DC voltage.

The power supply circuit further comprises a DC-DC conversion circuit, and the bus DC voltage passes through the DC-DC conversion circuit and outputs a low voltage DC.

The control circuit comprises a microprocessor, an inverter circuit, a rotor position detection circuit, and a memory. The rotor position detection circuit transmits a rotor position signal to the microprocessor; the microprocessor outputs a signal to drive the inverter circuit; the output end of the inverter circuit is connected to a coil winding of the stator assembly. The memory stores the operating data of the first speed and the operating data of the second speed. The rotor assembly comprises a permanent magnet.

Also provided is an electrical device comprising a cooling fan and a load, and the wind generated by the cooling fan cools the load. The cooling fan comprises a motor and a fan blade, and an input end of the motor of the cooling fan is connected to the first electric wire and the second electric wire of the commercial AC electric supply. The input end of the load is connected to the first electric wire and the second electric wire of the commercial AC electric supply, and a switch is disposed on the first electric wire. One end of the detection circuit is disposed between the switch and the load, and the other end thereof is connected to the motor.

The load can be a compressor.

The switch can be a relay switch.

Compared with the prior art, advantages of the motor assembly and an electrical device comprising the same according to embodiments of the disclosure are summarized as follows:

1) The motor assembly comprises a detection circuit between the detection wire and the grounding line; the detection circuit transmits a signal to the control circuit to control the motor to operate at different speeds. The detection circuit is convenient for wiring.

2) The detection circuit is not directly connected to the first electric wire and the second electric wire, preventing the wrong wiring.

3) The detection circuit is an optocoupler detection circuit. The optocoupler detection circuit is cost-effective.

DETAILED DESCRIPTION

To further illustrate, embodiments detailing a motor assembly and an electrical device comprising the same are described below. It should be noted that the following embodiments are intended to describe and not to limit the disclosure.

EXAMPLE 1

Figure 1:
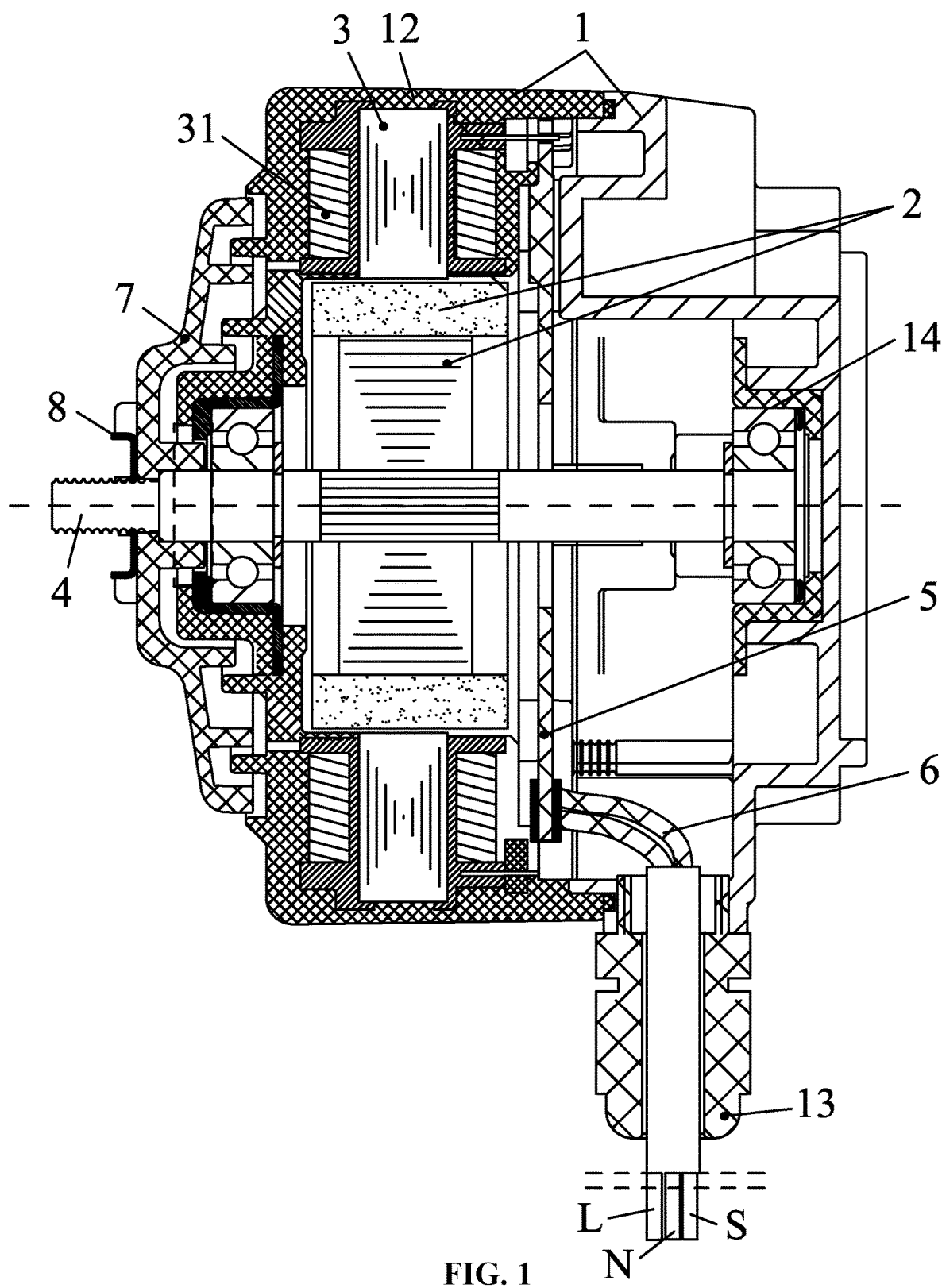
FIG. 1 is a cross-sectional view of a motor according to one embodiment of the disclosure.

As shown in FIG. 1, a motor assembly coupled to an input line of an external power source comprises a motor and a control circuit board 5. The motor comprises a housing 1, a stator assembly 3, a rotating shaft 4 and a rotor assembly 2. The control circuit board 5 comprises three lead wires 6, that is, a first electric wire L, a second electric N and a detection wire S. The first electric wire L and the second electric wire N are adapted to be connected to a commercial AC electric supply, and the detection wire S is an electric wire that detects whether or not the load connected to the motor is electrified. The control circuit board 5 is disposed inside the housing 1, and the rotor assembly 2 is mounted on the rotating shaft 4. The housing 1 comprises a plastic-packaged body and an aluminum casing. The plastic-packaged body covers the stator assembly 3. The plastic-packaged body and the aluminum casing each are provided with a bearing seat. The bearings 12 are disposed in the bearing seat, and the rotating shaft 4 is supported by the bearings 12. The shaft-extension end of the rotating shaft 4 is provided with a cap 7, and the cap 7 is provided with a nut 8. The cap 7 and the nut 8 can be used to mount the fan blade. A waterproof cover 13 is mounted on the housing 1, and the lead wires 6 are disposed inside the waterproof cover 13. The stator assembly 3 comprises a stator core and a coil winding 31.

Figure 2:
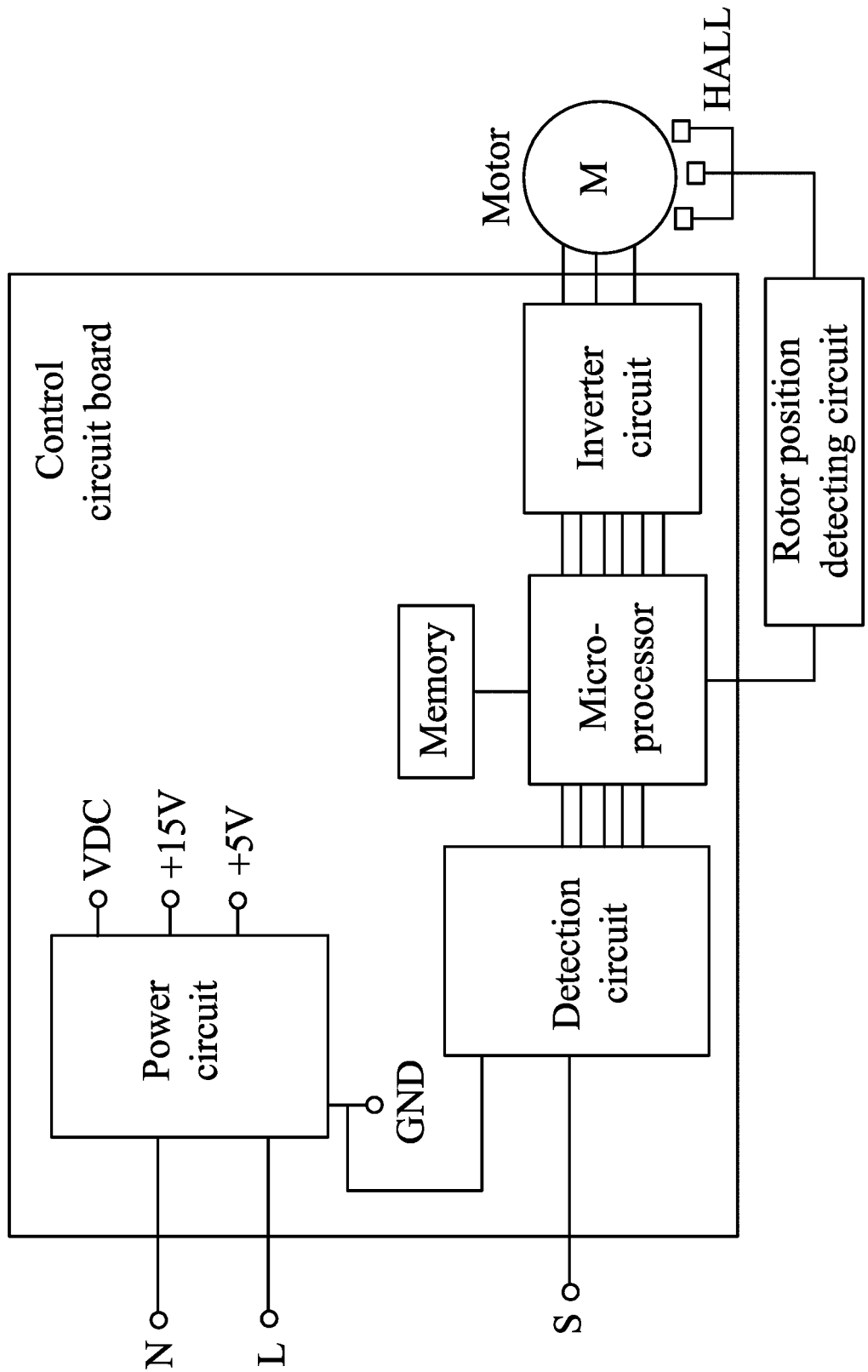
FIG. 2 is a circuit block diagram of a motor assembly according to one embodiment of the disclosure.
Figure 3:
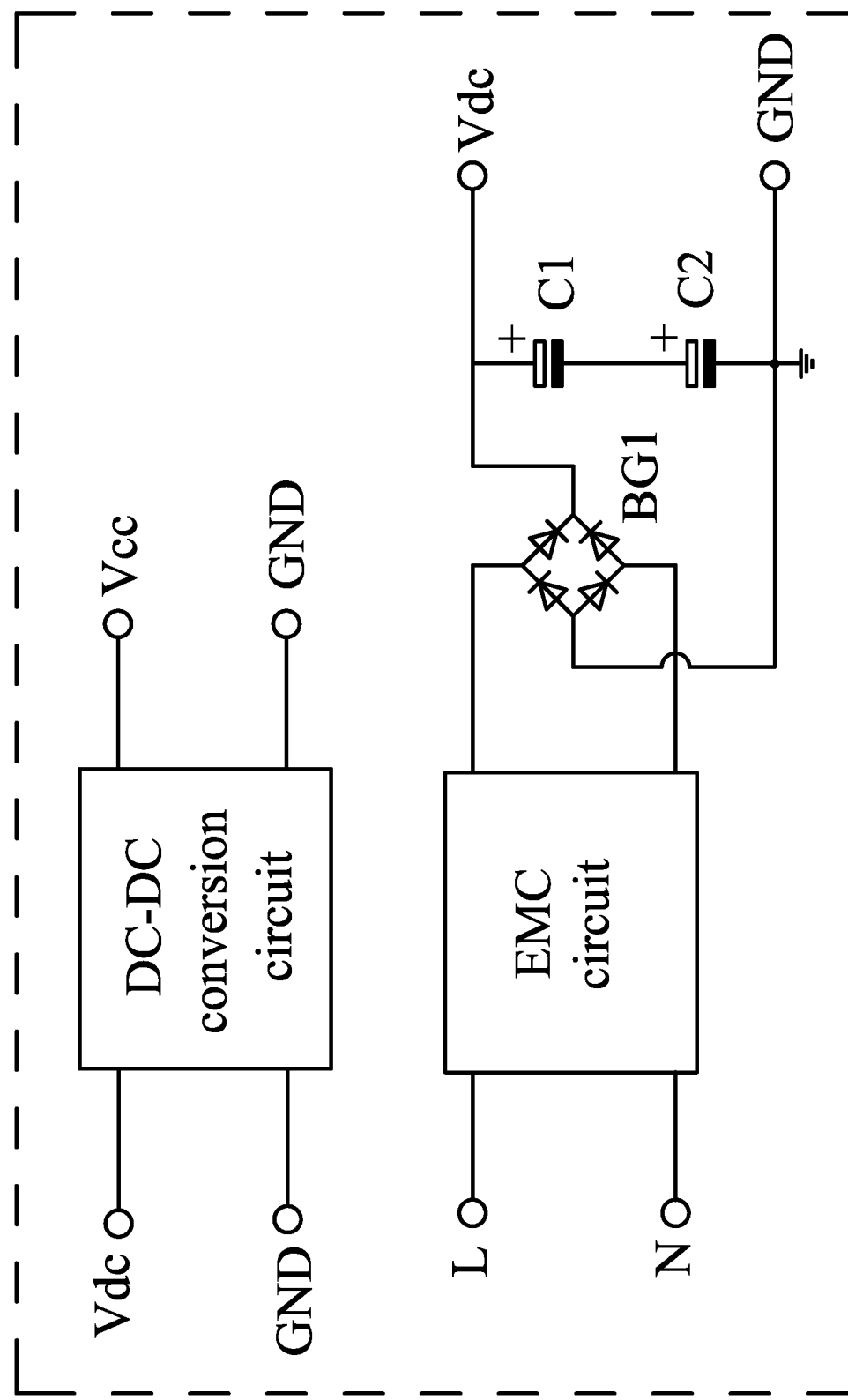
FIG. 3 is a circuit block diagram of a power supply circuit according to one embodiment of the disclosure.
Figure 4:
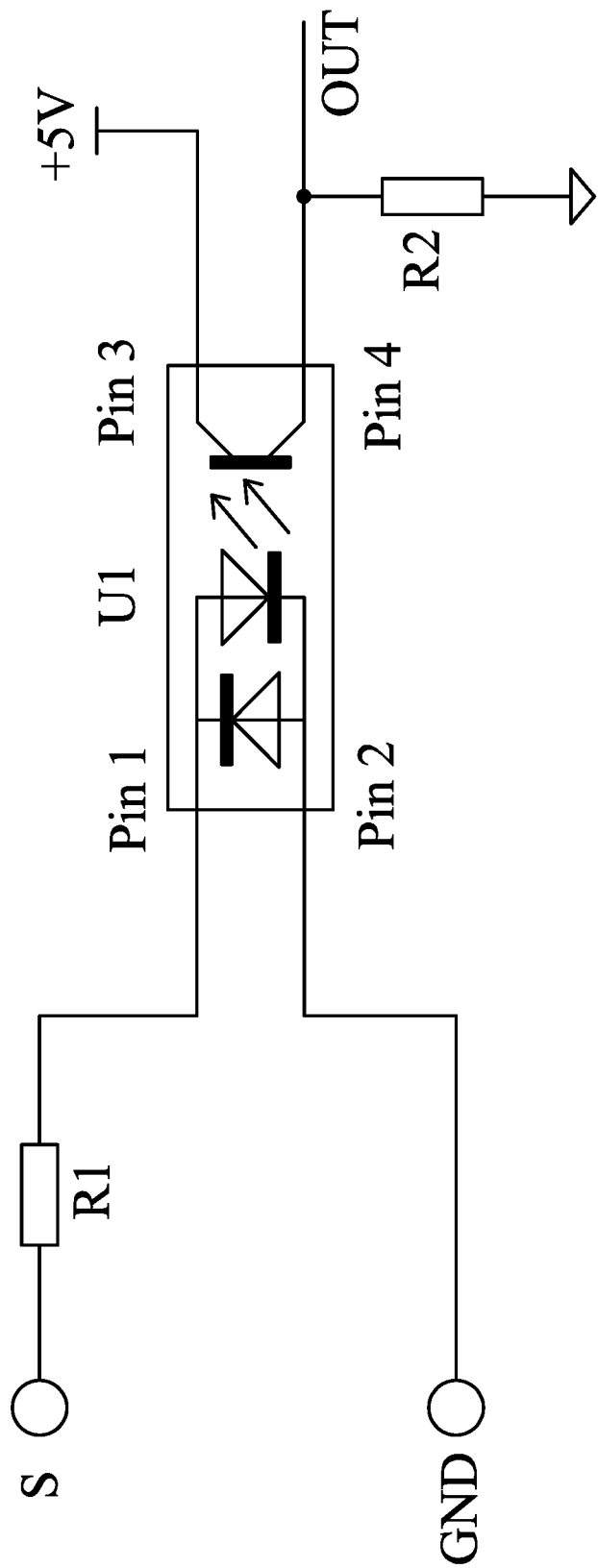
FIG. 4 is a circuit diagram of an optocoupler detection circuit according to one embodiment of the disclosure.

As shown in FIG. 2, FIG. 3 and FIG. 4, the control circuit comprises a microprocessor, an inverter circuit, a rotor position detection circuit, and a memory. The rotor position detection circuit (which is the Hall sensor HALL) transmits the rotor position signal to the microprocessor, and the microprocessor outputs a signal to drive the inverter circuit. The output end of the inverter circuit is connected to the coil winding of the stator assembly. The memory stores the operating data of a first speed and the operating data of a second speed. The rotor assembly comprises a permanent magnet.

The control circuit board comprises a power supply circuit, a control circuit and a ground wire GND. The first and second electric wires L and N are used as input terminals of the power supply circuit. The power supply circuit supplies a DC voltage to the electrical parts of the control circuit board. A detection circuit is disposed between the detection wire and the ground wire to detect whether or not a load connected to the motor is electrified. The detection signal is transmitted to the control circuit by the detection circuit, and the motor operates at various rotation speeds. When the load is not electrified, the detection circuit outputs a first level signal to the control circuit and the control circuit controls the motor to operate at a first speed. When the load is electrified, the detection circuit outputs a second level signal to the control circuit and the control circuit controls the motor to operate at a second speed.

The above detection circuit is an optocoupler detection circuit.

The optocoupler detection circuit comprises a first resistor R1, a second resistor R2 and an optocoupler U1, and the detection wire S is connected to the first pin of the optocoupler U1 through the first resistor R1; the second pin of the optocoupler U1 is connected to the ground wire GND; the third pin of the optocoupler U1 Connect a DC power supply. The fourth pin of the optocoupler U1 is connected to the second resistor R2 and then connected to the ground wire GND, and the fourth pin of the optocoupler U1 acts as a signal output pin. The power supply circuit comprises an electromagnetic compatibility (EMC) circuit and a rectifier BG1, and the commercial AC electric supply flows through the EMC circuit and the rectifier BG1 and outputs a bus DC voltage Vdc.

The power supply circuit further comprises a DC-DC conversion circuit, and the bus DC voltage Vdc passes through the DC-DC conversion circuit and outputs a low voltage DC Vcc.

The motor assembly comprises a detection circuit between the detection wire S and the grounding line GND. The circuit has a simple structure, low manufacturing cost and is convenient for wiring.

EXAMPLE 2

Figure 5:
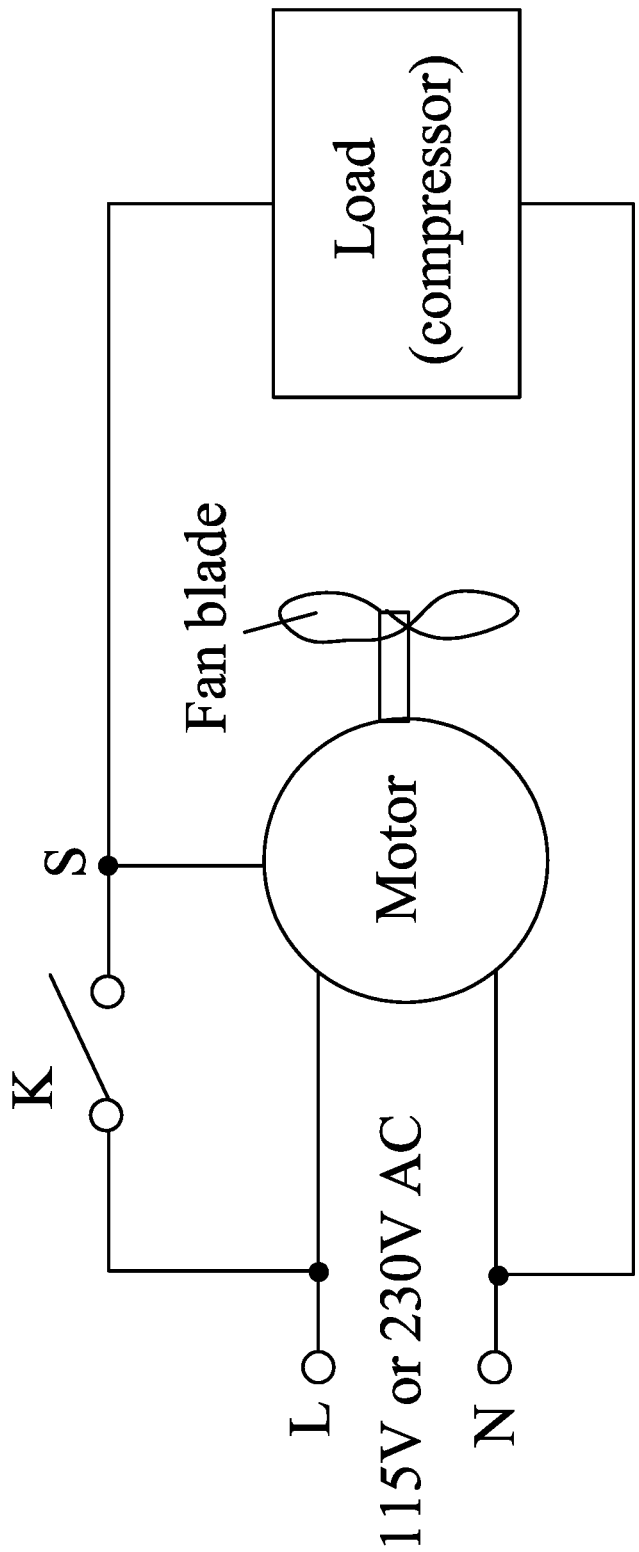
FIG. 5 is a circuit diagram of an electrical device according to another embodiment of the disclosure.

As shown in FIG. 5, an electrical device (such as a refrigerator) comprises a cooling fan and a load. The wind generated by the cooling fan can cool the load. The cooling fan comprises a motor and a fan blade, and the input end of the motor is connected to the first electric wire L and the second electric wire N (115 V AC or 230 V AC) of the commercial AC electric supply. The input end of the load is connected to the first electric wire L and the second electric wire N of the commercial AC electric supply, and the switch K is disposed on the first electric wire L. The detection wire S is disposed between the switch K and the load. The load is a compressor. The switch K is a relay switch.

It will be obvious to those skilled in the art that changes and modifications may be made, and therefore, the aim in the appended claims is to cover all such changes and modifications.

What is claimed is:

1. A motor assembly, comprising:
   a motor, the motor comprising a housing, a stator assembly, a rotating shaft, and a rotor assembly; and
   a control circuit board, the control circuit board comprising a first electric wire, a second electric wire, a detection wire, a ground wire, a power supply circuit, a control circuit, and a detection circuit;
   wherein:
   one end of the first electric wire and one end of the second electric wire are adapted to be connected to a commercial AC electric supply, and the other end thereof connected to input ends of the power supply circuit;
   the power supply circuit supplies a DC voltage to electrical parts of the control circuit board;
   the detection circuit is disposed between the detection wire and the ground wire to detect whether or not a load connected to the motor is electrified; and
   the detection wire transmits a detection signal to the control circuit, and the control circuit controls the motor to rotate in various rotation speeds.

2. The motor assembly of claim 1, wherein in operation, when the load is not electrified, the detection circuit outputs a first level signal to the control circuit and the control circuit controls the motor to operate at a first speed; when the load is electrified, the detection circuit outputs a second level signal to the control circuit and the control circuit controls the motor to operate at a second speed.

3. The motor assembly of claim 2, wherein the detection circuit is an optocoupler detection circuit.

4. The motor assembly of claim 3, wherein the optocoupler detection circuit comprises a first resistor, a second resistor and an optocoupler; the optocoupler comprises a first pin, a second pin, a third pin, and a fourth pin; the detection wire is connected to the first pin of the optocoupler via the first resistor; the second pin of the optocoupler is connected to the ground wire; the third pin of the optocoupler is connected to a DC power supply; the fourth pin of the optocoupler is connected to the second resistor and then to the ground wire, and the fourth pin of the optocoupler acts as a signal output pin.

5. The motor assembly of claim 1, wherein the power supply circuit comprises an electromagnetic compatibility (EMC) circuit and a rectifier, and the commercial AC electric supply flows through the EMC circuit and the rectifier and outputs a bus DC voltage.

6. The motor assembly of claim 2, wherein the power supply circuit comprises an electromagnetic compatibility (EMC) circuit and a rectifier, and the commercial AC electric supply flows through the EMC circuit and the rectifier and outputs a bus DC voltage.

7. The motor assembly of claim 3, wherein the power supply circuit comprises an electromagnetic compatibility (EMC) circuit and a rectifier, and the commercial AC electric supply flows through the EMC circuit and the rectifier and outputs a bus DC voltage.

8. The motor assembly of claim 4, wherein the power supply circuit comprises an electromagnetic compatibility (EMC) circuit and a rectifier, and the commercial AC electric supply flows through the EMC circuit and the rectifier and outputs a bus DC voltage.

9. The motor assembly of claim 5, wherein the power supply circuit further comprises a DC-DC conversion circuit, and the bus DC voltage passes through the DC-DC conversion circuit and outputs a DC voltage.

10. The motor assembly of claim 6, wherein the power supply circuit further comprises a DC-DC conversion circuit, and the bus DC voltage passes through the DC-DC conversion circuit and outputs a DC voltage.

11. The motor assembly of claim 7, wherein the power supply circuit further comprises a DC-DC conversion circuit, and the bus DC voltage passes through the DC-DC conversion circuit and outputs a DC voltage.

12. The motor assembly of claim 8, wherein the power supply circuit further comprises a DC-DC conversion circuit, and the bus DC voltage passes through the DC-DC conversion circuit and outputs a DC voltage.

13. The motor assembly of claim 5, wherein the control circuit comprises a microprocessor, an inverter circuit, a rotor position detection circuit, and a memory; the rotor position detection circuit transmits a rotor position signal to the microprocessor; the microprocessor outputs a signal to drive the inverter circuit; an output end of the inverter circuit is connected to a coil winding of the stator assembly; the memory stores the operating data of the first speed and the operating data of the second speed; and the rotor assembly comprises a permanent magnet.

14. The motor assembly of claim 6, wherein the control circuit comprises a microprocessor, an inverter circuit, a rotor position detection circuit, and a memory; the rotor position detection circuit transmits a rotor position signal to the microprocessor; the microprocessor outputs a signal to drive the inverter circuit; an output end of the inverter circuit is connected to a coil winding of the stator assembly; the memory stores the operating data of the first speed and the operating data of the second speed; and the rotor assembly comprises a permanent magnet.

15. The motor assembly of claim 7, wherein the control circuit comprises a microprocessor, an inverter circuit, a rotor position detection circuit, and a memory; the rotor position detection circuit transmits a rotor position signal to the microprocessor; the microprocessor outputs a signal to drive the inverter circuit; an output end of the inverter circuit is connected to a coil winding of the stator assembly; the memory stores the operating data of the first speed and the operating data of the second speed; and the rotor assembly comprises a permanent magnet.

16. The motor assembly of claim 8, wherein the control circuit comprises a microprocessor, an inverter circuit, a rotor position detection circuit, and a memory; the rotor position detection circuit transmits a rotor position signal to the microprocessor; the microprocessor outputs a signal to drive the inverter circuit; an output end of the inverter circuit is connected to a coil winding of the stator assembly; the memory stores the operating data of the first speed and the operating data of the second speed; and the rotor assembly comprises a permanent magnet.

17. A device, comprising a cooling fan and a load; the cooling fan comprising a motor of claim 1 and a fan blade, and an input end of the motor is connected to a first electric wire and a second electric wire of a commercial AC electric supply; an input end of the load is connected to the first electric wire and the second electric wire of the commercial AC electric supply, and the first electric wire is provided with a switch; and one end of the detection circuit is disposed between the switch and the load, and the other end thereof is connected to the motor.

18. The device of claim 17, wherein the load is a compressor.

19. The device of claim 17, wherein the switch is a relay switch.

20. The device of claim 18, wherein the switch is a relay switch.

* * * * *